(12) United States Patent
Hebert

(10) Patent No.: US 10,845,617 B1
(45) Date of Patent: Nov. 24, 2020

(54) EYEGLASS EXTENSION AND STRAP

(71) Applicant: Martin Hebert, Houma, LA (US)

(72) Inventor: Martin Hebert, Houma, LA (US)

( * ) Notice: Subject to any disclaimer, the term of this patent is extended or adjusted under 35 U.S.C. 154(b) by 51 days.

(21) Appl. No.: 16/265,331

(22) Filed: Feb. 1, 2019

Related U.S. Application Data

(60) Provisional application No. 62/625,146, filed on Feb. 1, 2018.

(51) Int. Cl.
*G02C 3/00* (2006.01)

(52) U.S. Cl.
CPC ............. *G02C 3/003* (2013.01); *G02C 3/006* (2013.01)

(58) Field of Classification Search
CPC .................................. G02C 3/003; G02C 3/006
See application file for complete search history.

(56) References Cited

U.S. PATENT DOCUMENTS

| | | | |
|---|---|---|---|
| 5,074,656 A | 12/1991 | Parrish | |
| 5,575,042 A | 11/1996 | Kalbach | |
| 5,654,787 A | 8/1997 | Barison | |
| 5,655,263 A | 8/1997 | Stoller | |
| 6,053,612 A | 4/2000 | MacIntosh, Jr. et al. | |
| 6,182,334 B1 | 2/2001 | Davancens | |
| 6,547,388 B1 | 4/2003 | Bohn | |
| 6,709,100 B2 | 3/2004 | Kalbach | |
| 6,817,069 B1 | 11/2004 | Tillstrom | |
| 7,467,867 B1 | 12/2008 | Williams | |
| 8,094,858 B2 | 1/2012 | Thiel et al. | |
| 8,366,268 B2 | 2/2013 | Willaims | |
| 8,523,350 B2 | 9/2013 | Krisik et al. | |
| 8,840,244 B2 | 9/2014 | Terry | |
| 2012/0307199 A1* | 12/2012 | Krisik | ..................... G02C 5/143 351/157 |
| 2013/0077043 A1* | 3/2013 | Moran | ................... G02C 5/143 351/118 |
| 2015/0103308 A1 | 4/2015 | Williams | |
| 2016/0170235 A1* | 6/2016 | Maalouf | ................. G02C 3/04 351/52 |

OTHER PUBLICATIONS

CROAKIES®; Arc Endless; https://www.croakies.com/product/arc-endless.

* cited by examiner

*Primary Examiner* — Wen Huang
(74) *Attorney, Agent, or Firm* — Garvey, Smith & Nehrbass, Patent Attorneys, L.L.C.; Seth M. Nehrbass; Mackenzie D. Rodriguez

(57) ABSTRACT

The present invention relates to an extension and strap for eyeglasses. More particularly, the present invention relates to an apparatus for holding eyeglasses onto a user's face that allows for eyeglasses to be put on and removed with only one hand. The present invention also includes a method of using the strap of the present invention to put on, retain in place, and remove eyeglasses using only one hand.

16 Claims, 8 Drawing Sheets

EYEGLASS EXTENSION AND STRAP

CROSS-REFERENCE TO RELATED APPLICATIONS

Priority of U.S. Provisional Patent Application Ser. No. 62/625,146, filed Feb. 1, 2018, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an extension and strap for eyeglasses. More particularly, the present invention relates to an apparatus for holding eyeglasses onto a user's face that allows for eyeglasses to be put on and removed with only one hand. The present invention also includes a method of using the strap of the present invention to put on, retain in place, and remove eyeglasses using only one hand.

2. General Background of the Invention

Eyeglasses including safety glasses, sunglasses, and prescription eyewear are generally known in the art and are typically secured to a user's face by ear piece that are curved to rest on top of the user's ears. This design is useful in that it is easily placed on and removed; however, it often allows glasses to slip down a user's face out of position, or off the user's head and ears completely requiring some type of securing device to keep eyeglasses in place. Different straps and securing devices are also known in the art, however these devices typically include a flexible and adjustable strap, which requires that the user use both hands to secure and tighten the strap into place.

The present invention allows a user to place their eyeglasses on securely with only one hand through the use of a semi-rigid strap that extends the ear pieces of the eyeglasses preventing them from slipping down the face or off the ears of the user, while still allowing the user to place on and remove the glasses using only one hand.

BRIEF SUMMARY OF THE INVENTION

The apparatus of the present invention is an apparatus for holding eyeglasses onto a user's face that allows for eyeglasses to be put on and removed with only one hand. The present invention also includes a method of using the strap of the present invention to put on, retain in place, and remove eyeglasses using only one hand

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

The present invention is an apparatus 1, 10 for securing eyeglasses 2 to a user 9 and method of using the apparatus 1, 10 to securely place eyeglasses 2 on a user 9 and remove them from the user using only one hand of the user 9.

Figure 9:
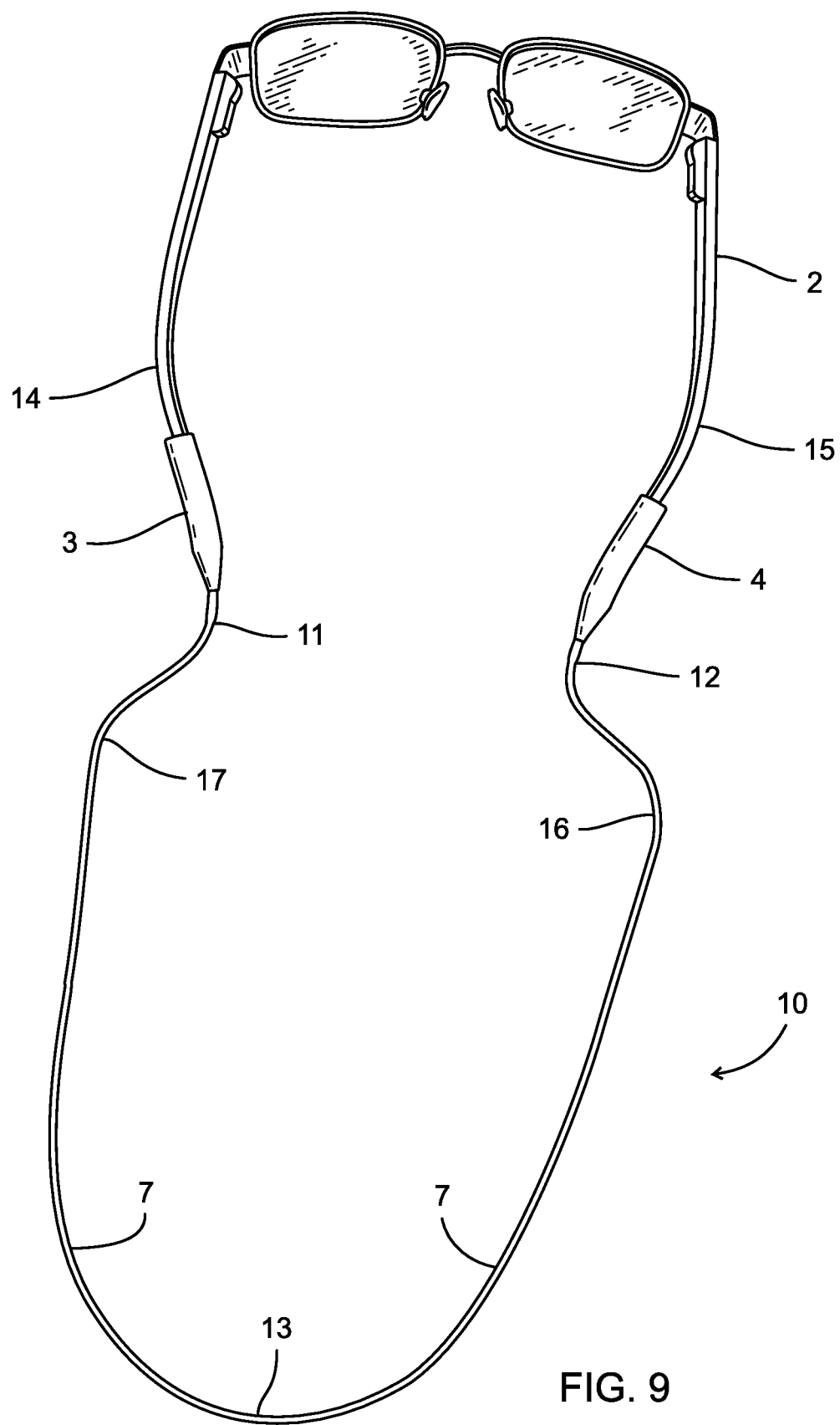

As shown in FIG. 9, the apparatus 10 preferably comprises a semi-rigid strap 7, a left connector 3, and a right connector 4. Preferably, the semi-rigid strap 7 is generally U-shaped having two ends 11, 12 and a curved center 13. More preferably, the semi-rigid strap 7 has two side curve portions 16, 17, each side curve portions 17, 16 being near each end of the strap 11, 12 such that the strap 7 has one S-shaped curve at each end 11, 12, and a curved center 13. Preferably, the semi-rigid strap 7 is made of semi rigid plastic or rubber, such as monofilament nylon, polyvinylidene difluoride, polyvinyl chloride, polypropylene, or polyethylene. A prototype was made with monofilament nylon. It can be made either in two pieces or molded together.

Preferably, the left connector 3 connects the left ear piece 14 of the eyeglasses 2 to one end 11 of the semi-rigid strap 7, and the right connector 4 connects the right ear piece 15 of the eyeglasses 2 to the other end 12 of the semi-rigid strap 7. Preferably, the left and right connectors 3, 4 are made of rubber or another suitable material that allows the connectors 3, 4 to be securely attached to the ear pieces 14, 15, preferably by sliding the ear pieces 14, 15 into the connectors 3, 4 like a sleeve. The suitable material can be nitrile, hydrogenated nitrile, Viton rubber, or natural rubber. A prototype was made with nitrile.

Figure 1:
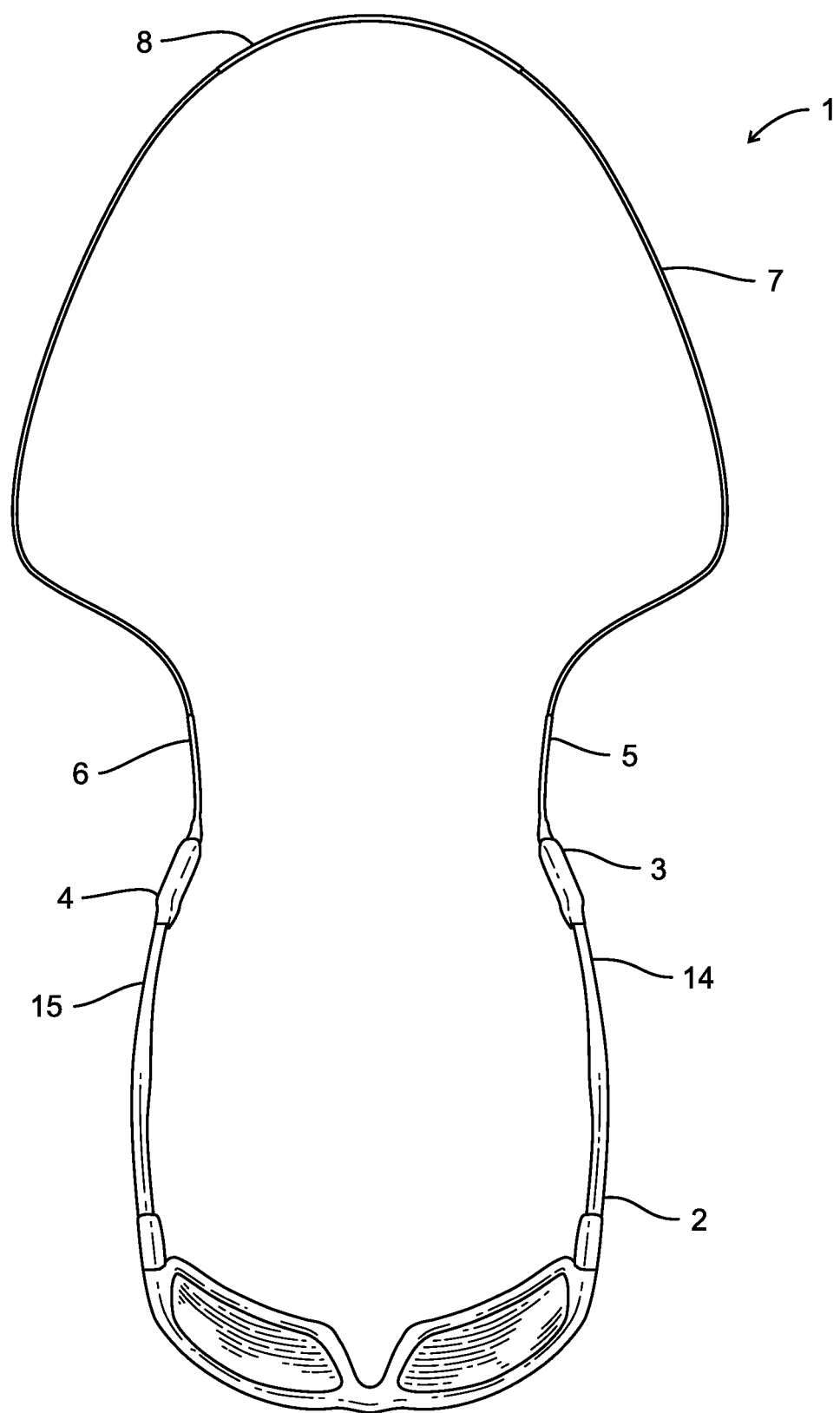
FIG. 1 is a top view of a preferred embodiment of the apparatus of the present invention attached to a pair of eyeglasses.
Figure 2:
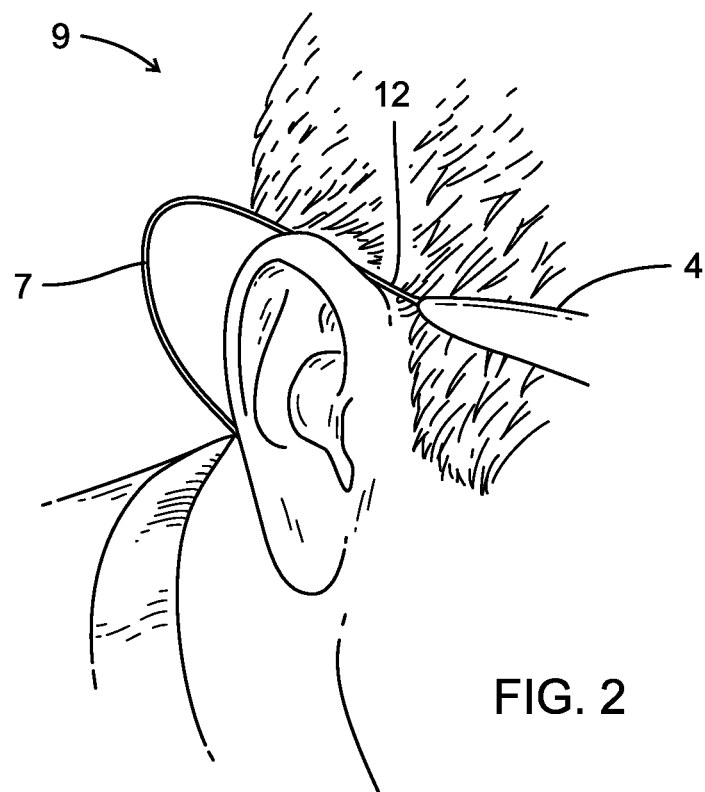
FIGS. 2-8 are various views of the steps of a preferred method of the present invention; and, FIG. 9 is a top view of a preferred embodiment of the present invention.
Figure 3:
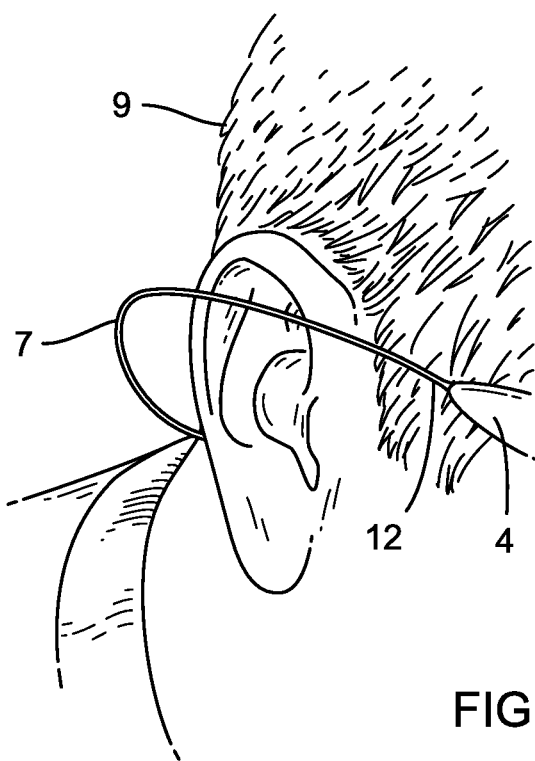
Figure 4:
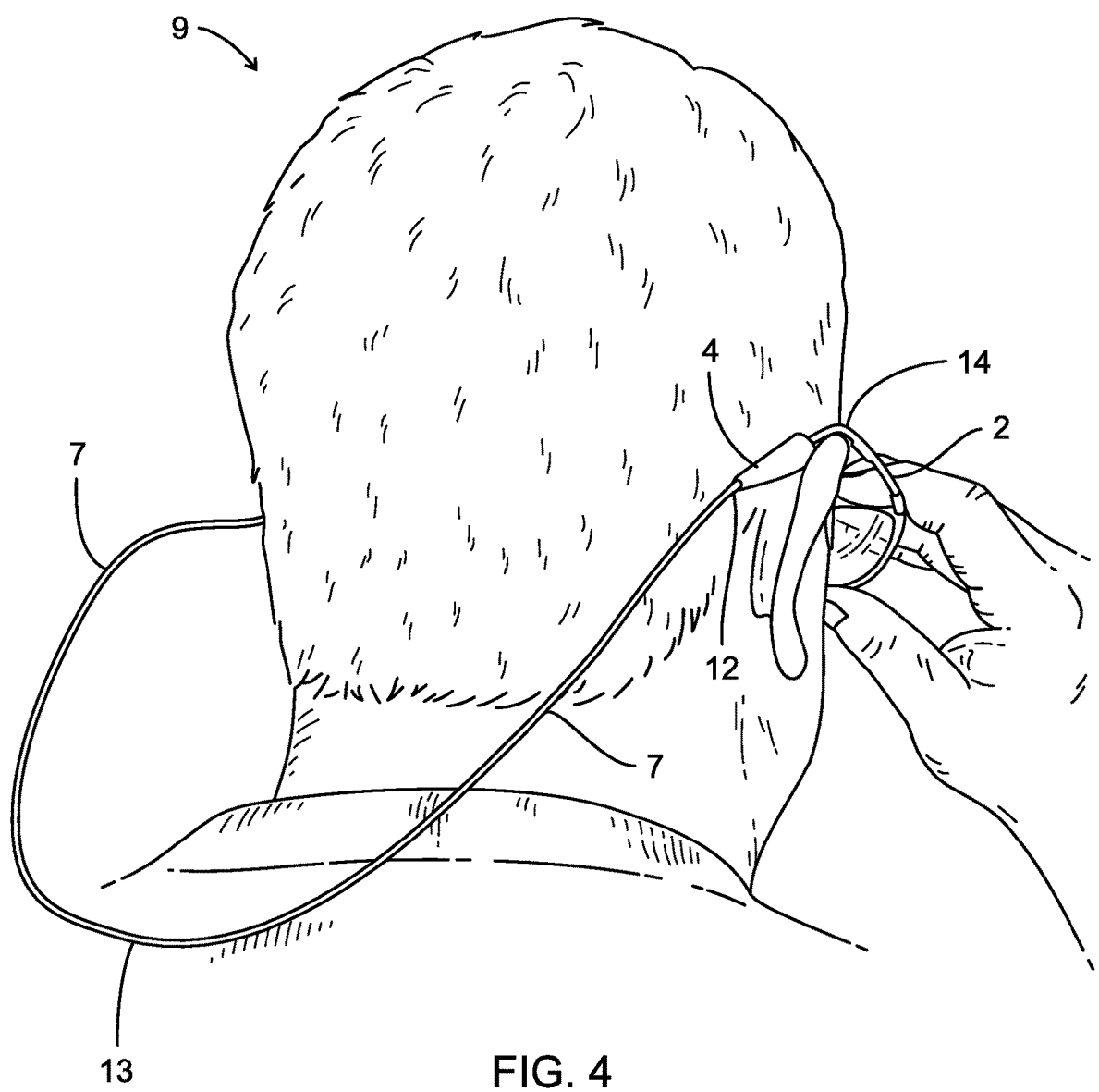
Figure 5:
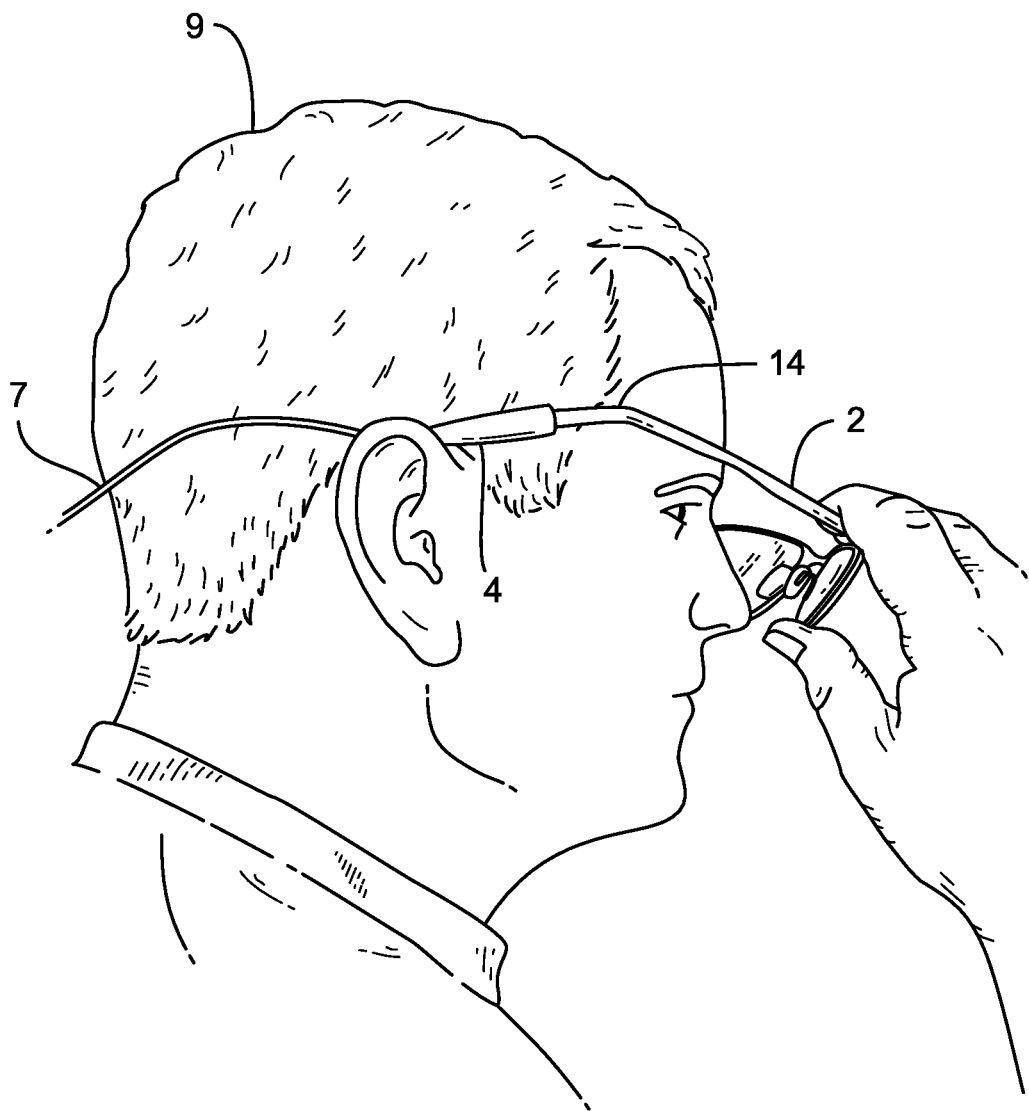
Figure 6:
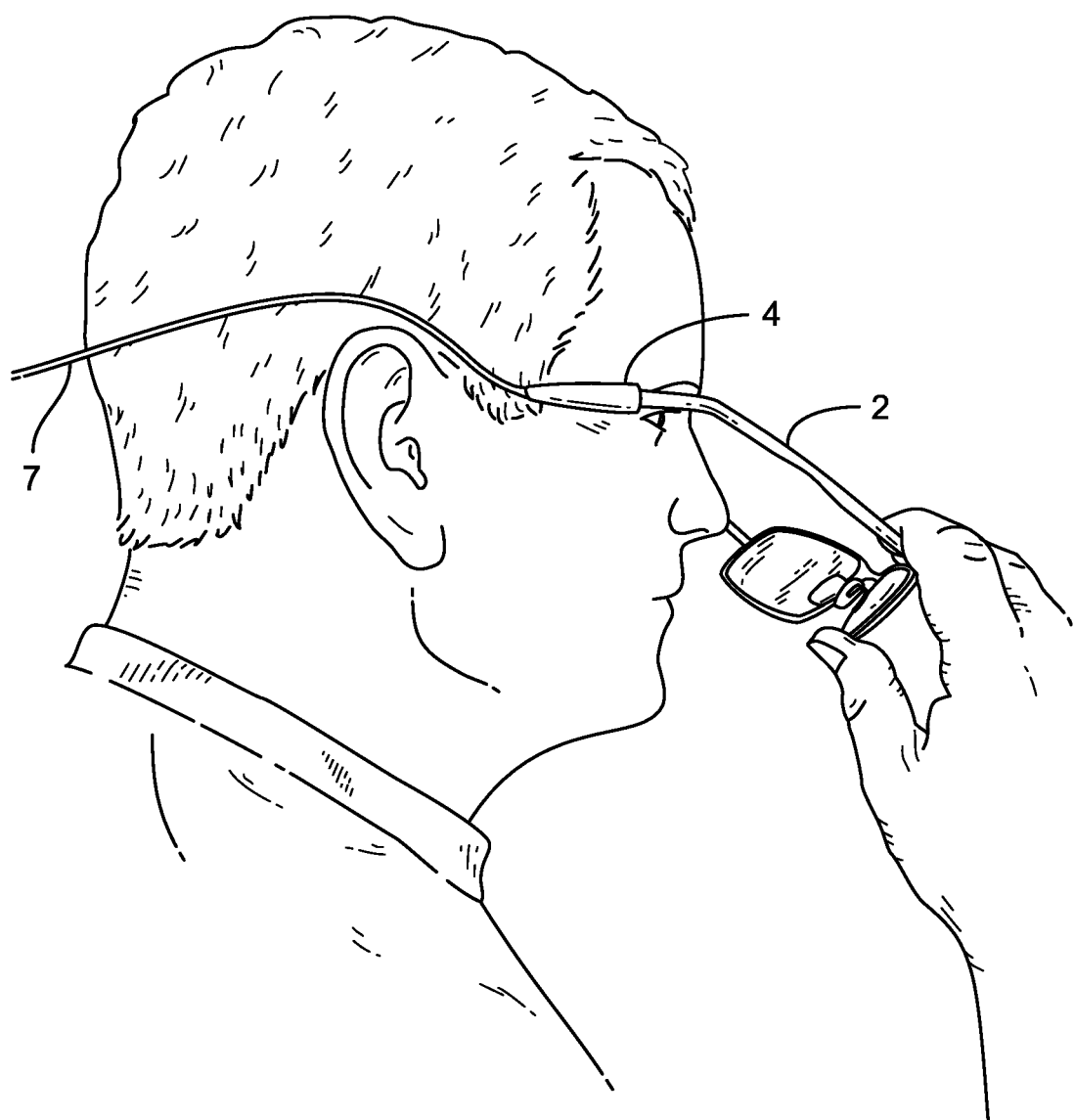
Figure 7:
Figure 8:
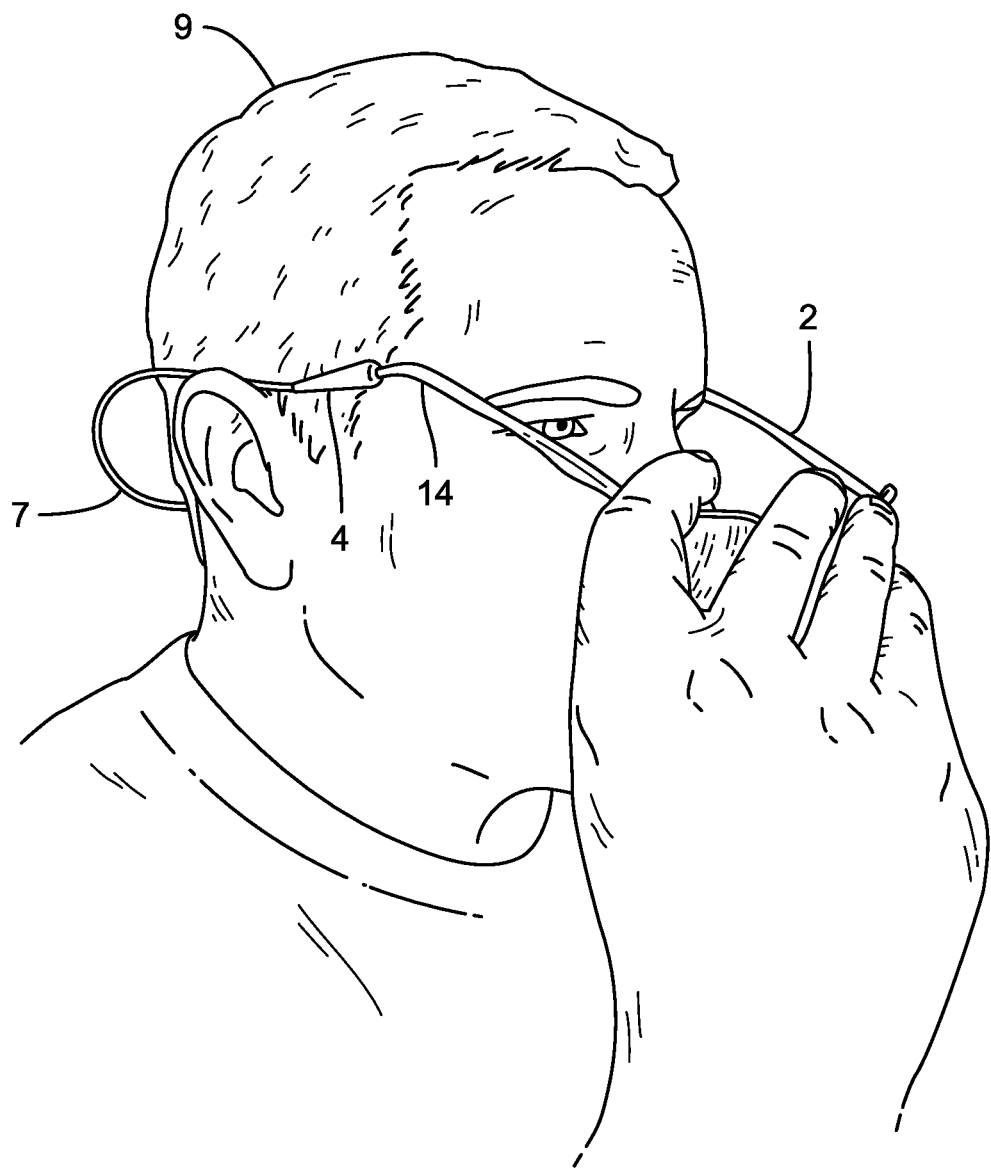

In one embodiment shown in FIG. 1, the apparatus 1 may further include two extenders 5, 6, each extender 5, 6 being placed between each connector 3, 4 and each end 11, 12 of the semi-rigid strap 7. Preferably, the extenders are made of flexible rubber (such as nitrile, hydrogenated nitrile, Viton rubber, or natural rubber). A prototype was made with polyvinyl chloride (shrink wrap).

In one embodiment shown in FIG. 1, the apparatus 1 further comprising a head support 8 at the curved center 13 of the semi-rigid strap 7. Preferably, the head support is made of flexible rubber, (such as nitrile, hydrogenated nitrile, Viton rubber, or natural rubber). A prototype was made with polyvinyl chloride (shrink wrap).

The present invention also includes a method of placing eyeglasses 2 on a user's 9 face using the apparatus of the present invention, the method comprising the following steps:

a) fitting the eyeglasses 2 with the apparatus 1, 10 of the present invention; and b) using only one hand of the user 9, placing the semi-rigid strap 7 over the user's 9 head, and the ear pieces 14, 15 of the eyeglasses 2 in place on the user's 9 ears.

The method may further include a removal step:

c) using only one hand of the user 9, removing the eyeglasses 2 from the user 9 by lifting the ear pieces 14, 15 off the user's 9 ears and lifting the semi-rigid strap 7 over the user's 9 head.

The apparatus 1 can these also be removed from the face and hung around the user's neck? The rubber connectors help hold the glasses in place. The curved design (16 and 17) allows glasses to be put on and removed easily with one hand. The design also decreases wear and tear on the glasses associated with abnormal bending and flexing from putting them on and off with a conventional strap.

Preferably, step a) is carried out by attaching the connectors 3, 14 to the ear pieces 14, 15 by securing the connector 3, 4 over and around the ear piece 14, 15.

The eyeglasses 2 may be any type of eyewear including sunglasses, safety glasses, reading glasses or other prescription eyewear.

PARTS LIST

The following is a list of parts and materials suitable for use in the present invention:

| Parts Number | Description |
| --- | --- |
| 1 | apparatus of a preferred embodiment of the present invention attached to eyeglasses |
| 2 | eyeglasses |
| 3 | left connector |
| 4 | right connector |
| 5 | left extender - optional |
| 6 | right extender - optional |
| 7 | strap |
| 8 | head support - optional |
| 9 | user |
| 10 | apparatus of a preferred embodiment of the present invention attached to eyeglasses |
| 11 | end |
| 12 | end |
| 13 | curved center |
| 14 | ear piece |
| 15 | ear piece |
| 16 | side curve portion |
| 17 | side curve portion |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. Apparatus for securing eyeglasses to a user, the apparatus comprising
   a semi-rigid strap,
   a left connector,
   a right connector, and
   two extenders,
   wherein the eyeglasses have a left ear piece and a right ear piece, and wherein the semi-rigid strap is generally U-shaped having two ends and a curved center, and wherein the left connector connects the left ear piece to one end of the semi-rigid strap, and the right connector connects the right ear piece to the other end of the semi-rigid strap, and
   wherein each extender being placed between each connector and each end of the semi-rigid strap.

2. The apparatus of claim 1 wherein the left and right connectors are made of rubber.

3. The apparatus of claim 1 wherein the semi-rigid strap is made of plastic or rubber.

4. The apparatus of claim 1 wherein the semi-rigid strap has two side curve portions, each side curve portions being near each end of the strap such that the strap has, one curve at each end, and a curved center.

5. The apparatus of claim 1 wherein the extenders are made of flexible rubber.

6. The apparatus of claim 1 further comprising a head support, the head support being placed at the curved center of the semi-rigid strap.

7. The apparatus of claim 6 wherein the head support is made of flexible rubber.

8. A method of placing eyeglasses on a user's face comprising:
   a) fitting the eyeglasses with an apparatus for securing eyeglasses to a user's head;
   wherein the apparatus comprises:
   a semi-rigid strap,
   a left connector,
   a right connector, and
   two extenders,
   wherein the eyeglasses have a left ear piece and a right ear piece, and wherein the semi-rigid strap is generally U-shaped having two ends and a curved center, and wherein the left connector connects the left ear piece to one end of the semi-rigid strap, and the right connector connects the right ear piece to the other end of the semi-rigid strap, and
   wherein each extender being placed between each connector and each end of the semi-rigid strap; and
   b) using only one hand of the user, placing the semi-rigid strap over the user's head, and the ear pieces of the eyeglasses in place on the user's ears.

9. The method of claim 8 further comprising the following after step b):
   c) using only one hand of the user, removing the eyeglasses from the user by lifting the ear pieces off the user's ears and lifting the semi-rigid strap over the user's head.

10. The method of claim 8 wherein the eyeglasses are fitted with the apparatus is step a) by attaching the connectors to the ear pieces by securing the connector over and around the ear piece.

11. The method of claim 8 wherein the eyeglasses are sunglasses.

12. The method of claim 8 wherein the eyeglasses are prescription eyeglasses.

13. The method of claim 8 wherein the left and right connectors are made of rubber.

14. The method of claim 8 wherein the semi-rigid strap is made of plastic or rubber.

15. The method of claim 8 wherein the semi-rigid strap has two side curve portions, each side curve portions being near each end of the strap such that the strap has, one curve at each end, and a curved center.

16. The method of claim 8 wherein the semi-rigid strap and glasses are removed from the user's face and hung around the user's neck.

* * * * *